United States Patent Office 2,868,067
Patented Jan. 13, 1959

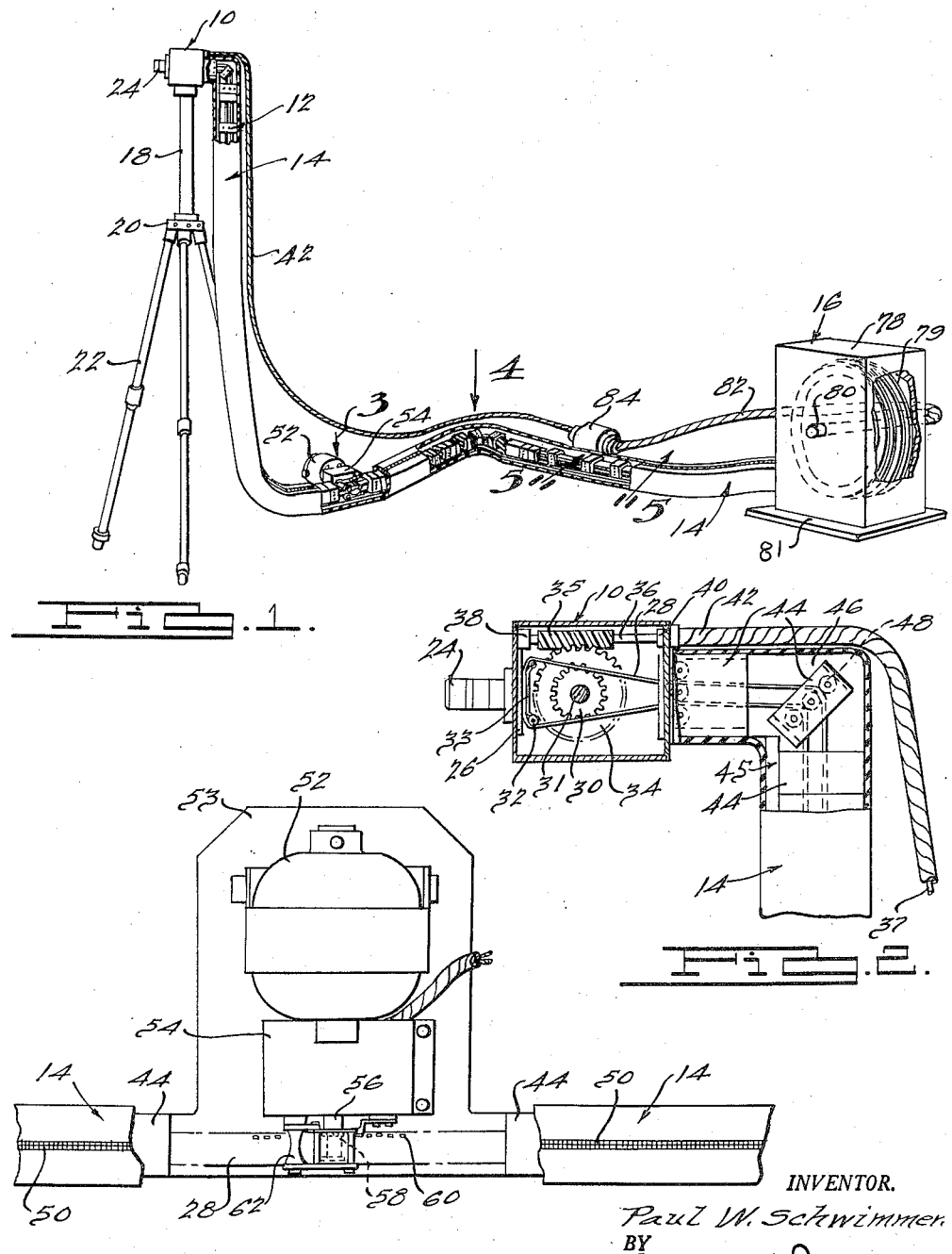

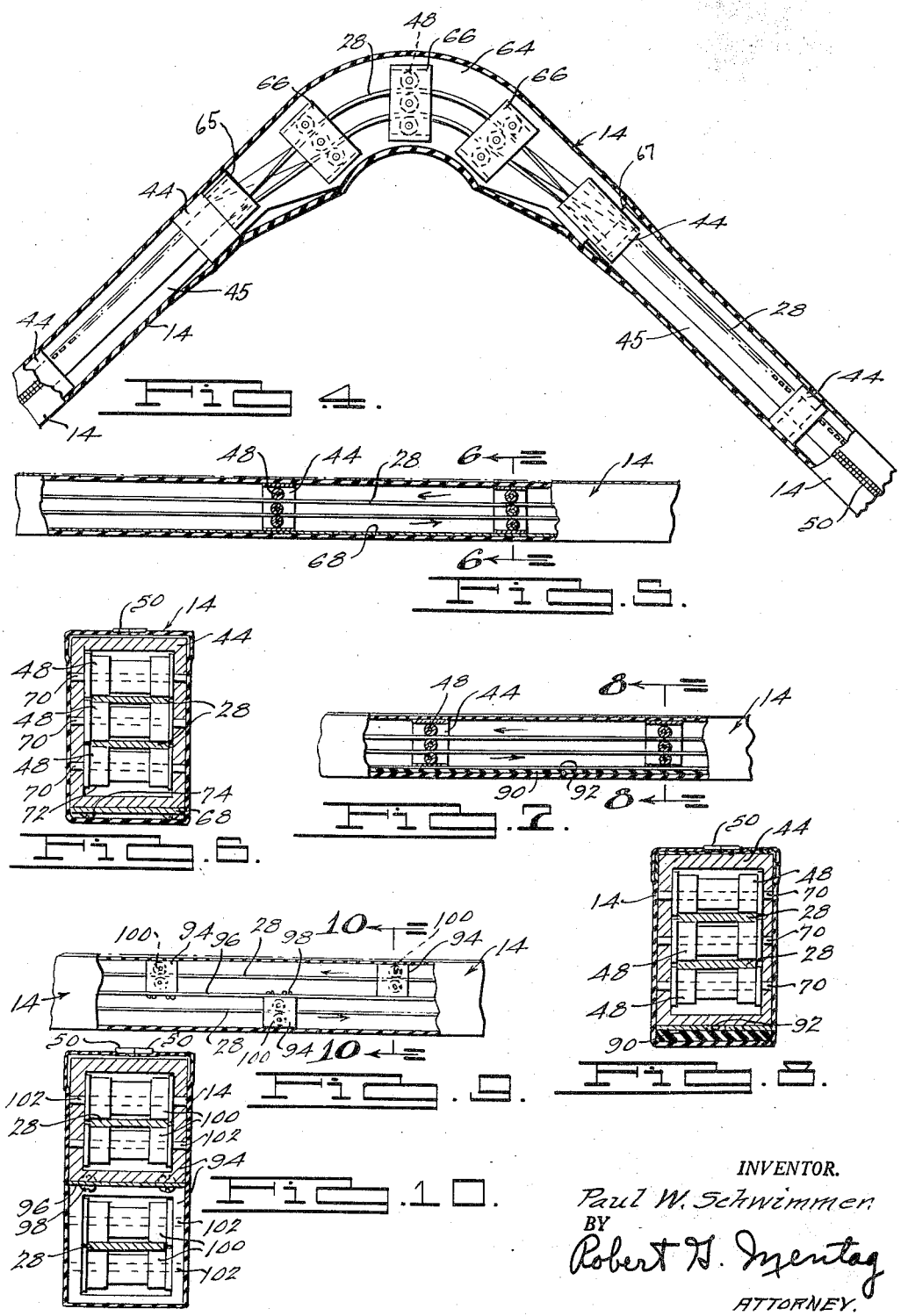

2,868,067

REMOTELY LOCATED SUPPLY SYSTEM AND APPARATUS FOR A CAMERA

Paul W. Schwimmer, Detroit, Mich.

Application August 2, 1954, Serial No. 447,016

4 Claims. (Cl. 88—17)

This invention relates generally to cameras and, more particularly, to a remotely located camera supply system and apparatus capable of feeding film, paper, tape and the like, to any type of camera.

In many instances during a photographic operation, it is desirable to expose a great length of continuous film, a length much longer than what the film supply magazines on the prior art cameras are capable of supplying. Heretofore, in such cases, in order to expose the desired length of film it has been necessary to mount a plurality of cameras so disposed and timed, that a second camera started when the first camera ran out of film and so forth. A disadvantage of using a plurality of cameras in such cases, as for example in aerial photography, is that much extra space is needed for installing the extra cameras. Other disadvantages are, the added weight involved, and the added cost and upkeep of the extra cameras. Accordingly, it is the principal object of this invention to provide a novel camera supply system in which the supply magazine may be disposed at a distance from the camera, whereby the camera may be placed in a small area, as in the forward portion of an airplane wing and, the magazine may be disposed where there is room for reels large enough to carry the desired length of film, paper, tape and the like, as for example, someplace in the fuselage of the airplane.

Another object of the invention is to provide a novel camera supply apparatus capable of supplying a greater length of continuous film, paper, tape and the like, to a camera than has been heretofore possible by any prior art supply apparatus.

A further object of the invention is to provide a novel apparatus for conveying photographic film from a remotely disposed magazine, through a light-tight channel, to a camera.

Another object of the invention is to provide a novel film, paper, tape and the like supply system which eliminates the necessity of storing said film, paper, tape and the like at the camera.

Another object of the invention is to provide a camera supply apparatus including a flexible conveying mechanism adapted to be actuated by a flexible drive means.

A further object of the invention is to provide a camera supply system and apparatus therefor, whereby it is possible to locate the film, paper, tape and the like reels at any desired distance from the position of the camera or point of exposure.

A still further object of the invention is to provide a novel device having a film, paper, tape and the like, exposure means, a remotely located magazine means to support reels for holding said paper, film, tape and the like, a flexible conveying means interconnecting the exposure means and magazine, a light-tight means adapted to enclose the conveying means and, a flexible drive means to drive the film, paper, tape and the like, from the magazine and over the flexible conveying means and back to the magazine.

Other objects, features and advantages of the present invention will become apparent from the following detailed description taken in conjunction with the accompanying drawings.

In the drawings:

Figure 1 is a perspective view of an illustrative embodiment of the invention, showing a photographic apparatus;

Figure 2 is an enlarged partial, broken away view, showing the operative relationship between the flexible film conveying means and the photographic camera;

Figure 3 is a view of the structure illustrated in Figure 1, being enlarged and taken in the direction of arrow 3;

Figure 4 is an enlarged partial view of the structure illustrated in Figure 1, taken in the direction of arrow 4;

Figure 5 is a partial vertical sectional view of the structure illustrated in Figure 1, taken along the line 5—5 thereof;

Figure 6 is a vertical sectional view of the structure illustrated in Figure 5, taken along the line 6—6 thereof;

Figure 7 is a partial vertical sectional view of a second modification of the flexible conveying means of the present invention;

Figure 8 is a vertical sectional view of the structure illustrated in Figure 7, taken along the line 8—8 thereof;

Figure 9 is a partial vertical sectional view of a third modification of the flexible conveying means of the present invention; and Figure 10 is a vertical sectional view of the structure illustrated in Figure 9, taken along the line 10—10 thereof.

Referring now to the drawings and, particularly to Figure 1, the reference numeral 10 designates a photographic camera or exposure means to which is operatively connected a flexible film conveying means 12 made in accordance with the principles of the invention. The flexible film conveying means 12 is covered or enclosed by a light-tight means 14 and is adapted to be operatively connected to a remotely located film magazine 16. The camera 10 may be supported by any suitable means, but for the sake of illustration is shown as being supported by a vertical rod 18 adjustably secured as at 20, to a conventional tripod 22. The camera 10 is provided with the usual lens 24, and shutter 26 mechanism for exposing the film 28. Operatively mounted in the camera 10 is a film-engaging sprocket-wheel 30 which is fixedly mounted on a shaft 31 and adapted to engage the film 28 and pass it through the camera 10. The camera 10 is provided with film guide rollers 32 and guide 33 adapted to pass the film past the exposure portion of the camera.

The shaft 31 operatively carries a worm-gear 34 which meshably engages a worm 35 mounted on an elongated shaft 36. The shaft 36 is rotatably mounted in the camera 10 as by the bearing members 38 and 40. A flexible drive shaft 37 is operatively connected to the shaft 36 at the point marked 40, and this is best seen in Figure 2. The flexible drive shaft 37 is provided with a suitable covering 42, preferably made from some type of flexible material, as for example flexible metal tubing.

The flexible film conveying means 12 comprises a plurality of spaced tubular members 44 fixedly mounted on a base member 45 which is preferably formed from a flexible material such as a strip of a suitable flexible metal, rubber, or the like. The base member 45 could be used over the complete length between the camera 10 and the magazine 16, but it has been found better to use a rigid base portion at points in the conveying means where curves or turns have to be made. As for example, in Figure 2, it is seen that the base member adjacent the camera 10 comprises a vertical rigid portion 46 to which the tubular members 44 at such position are attached. The tubular member 44 adjacent to the camera may be attached thereto by any suitable means as by a press fit or by machine screws. Each of the tubular members 44 carries film guide means such as the rollers 48 and, it will be obvious that the rollers 48 may be formed as desired and may be supported by means of ball bearings or the like if desired.

The light-tight member 14 encloses the conveying means 12 over its entire length but it is detachable therefrom and is provided with a zipper 50. The zipper 50 runs the entire length of the light-tight member 14. The ends of the light-tight member may be attached to the camera 10 and to the magazine 16 by any suitable fastening means. The light-tight member 14 may be made from any suitable material but is preferably made from a rubber clothlike material.

As is best seen in Figures 1 and 3, the length of film 28 may be actuated over the conveying means 12 by one or more booster motors as 52 in addition to the drive that the film 28 gets by the sprocket 30. The motor 52 is preferably a synchronous motor and is mounted on a rigid base member 53. The booster motor 52 is operatively connected to a gear box as 54, from which extends a drive shaft 56 carrying a film-engaging sprocket-wheel 58. The sprocket-wheel 58 is adapted to operatively engage the film 28 as by means of the holes 60 in the film. The booster motor 52 may also be provided with idler guide rollers as 62.

As was previously mentioned, the conveying means 12 is preferably provided with a rigid base member at places where the conveying means takes a turn. This is best seen in Figure 4, wherein the base member 64 is rigid and extends from the points 65 and 67, at which points the flexible base member 45 meets the rigid base member 64.

As is best seen in Figures 4, 5, and 6, the tubular members 44 are disposed in places where the conveying means 12 is on the horizontal so that the film guide rollers 48 are disposed on a horizontal axis. However, in order to make the film 28 pass around a curve or make a turn, it is necessary to dispose the guide roller holders 44 on their side as is shown in Figure 4 by the numerals 66. This position puts the rollers 48 on a vertical axis and allows the film 28 to make a turn smoothly and without breaking.

Figure 6 shows a preferred form of the conveying means 12 wherein the film guide rollers 48 are carried on shafts 70 in the tubular members 44 in a bank of three rollers. The rollers 48 are preferably provided with a stepped face as shown by the numeral 72 in order to cut down the surface contact area on the film 28 to lessen chances of marring the surface of the film. The flexible base member 45 may be made from a flexible metal strip 68 which may be suitably attached to each of the tubular members 44, as by the screws 74.

The magazine 16 may be any conventional film magazine or it may be especially designed to suit any special purpose. As is seen in Figure 1, the illustrative embodiment shows a magazine 16 which is roughly boxlike in construction and carries within film reels 79 rotatably mounted on a shaft 80. The magazine is enclosed by a cover member 78 which carries the outer ends of the shaft 80 and which is supported by a suitable base 81. The reels 79 may be made as large as desired, depending on the length of film that it is desired to expose.

A synchronous motor 84, which is provided with a plural power outlet, is adapted to drive the flexible shaft 37 which engages the film 28 by means of the sprocket-wheel 30 in the camera 10. The motor 84 also may be adapted to drive the reels 79 by means of the flexible shaft 82 which may be operatively connected to the shaft 80.

In use, it will be obvious that the camera 10, because of its small size, may be placed in areas which are inaccessible to the usual photographic cameras because of their size. The camera 10 for example, may be placed in the forward portion of an airplane wing where it could be positioned to take a complete picture of the bombing run of a dive-bomber, and so forth. It is impossible to do such a thing with the usual movie camera because of the great length of film needed in such case and the usual magazine mounted on such cameras does not carry such a great length of film. The instant device however, is well adapted for such use. The reels 79 may be positioned well back in the fuselage where they may be easily loaded and unloaded and may be as large as desired. The present invention may also be used in many other fields, as for example in industry when it is desired to take a great number of frames of a tool cutting action to provide means for studying the cutting action of the tool. The small size of the camera 10 would permit pictures to be taken on a machine tool in places which are now inaccessible to the usual movie camera. The uses to which the present apparatus may be put are unlimited.

In setting up the apparatus for use, the camera 10 would be placed in the desired location and then the flexible conveying means 12 would be connected to the camera. The conveying means 12 would have to be designed for each case, since some jobs would require more turns than others and be longer than others. Also, the length of the conveying means would determine whether or not booster drive means such as 52 would be used or not. After the conveying means 12 is installed, the magazine 16 may be suitably connected to the conveying means and the light-tight enclosure 14 may then be assembled. As was previously mentioned, the light-tight enclosure 14 is provided with a zipper 50 to permit the light-tight enclosure 14 to be opened so that a leader strip of film may be put in the system and be connected to the film on the reels 79 in the magazine. Since the reels 79 would be both attached to the shaft 80 the film would feed off the top of one reel 79 and feed back into the bottom of the other reel 79 upon its return from the camera.

After the apparatus is all set-up, the drive motors 52 and 84 may be electrically connected to work together in what is known as synchronous operation. It will be obvious to one skilled in the art as to how the motors could be wired for such operation.

The camera 10 may be provided with any conventional shutter actuation mechanism designed to work in conjunction with the drive motors 52 and 84.

Figures 7 and 8 show a modified base member 90 made from a rubber material and carrying a wire 92 disposed along its center for grounding purposes. This rubber type base member 90 may be used in places where the metal base member 68 may not be suitable.

Figures 9 and 10 show a further modification of the flexible conveying means 12, in which the base member 96 is metal and in which the tubular members 94 are disposed on both the upper and lower sides of the base member 96 and are held thereto by means of the screws 98. As is best seen in Figure 10, the tubular members 94 each carry a pair of film guide rollers 100 suitably journaled on shafts 102. It will be obvious, that the upper sets of rollers are adapted to carry the film to the camera, and the lower sets of rollers are adapted to carry the film from the camera back to the magazine.

It will be obvious, that the principles of the invention may be applied to all types of cameras or exposure means, as for example, to an electronic camera of the type which transmits the picture to a tape. Such electronic cameras require great lengths of continuous tape during the operation thereof and, the instant invention provides an improved and economical system for supplying the tape.

While it will be apparent that the preferred embodiments of the invention herein disclosed are well calculated to fulfill the objects above stated, it will be understood that the invention is susceptible to modification, variation and change without departing from the proper scope or fair meaning of the subjoined claims.

What is claimed is:

1. Apparatus of the character described, in combination, a camera, a conveying means, said conveying means being operatively connected to said camera, a film and the like storage means, said conveying means also being operatively connected to said storage means, said conveying means being comprised of a plurality of interconnected rigid and flexible base member portions carrying a pair of film guide means thereon, a detachable light-tight means enclosing said conveying means, and power drive means operatively connected to said conveying means to actuate said film and the like from the storage means over one of said guide means to the camera for exposure and, thence back over the other of said guide means to the storage means.

2. Apparatus of the character described, in combination, a camera, said camera being provided with a film driving mechanism; a film supply magazine remotely located from said camera and on a different horizontal plane and vertical plane than said camera; a shaft rotatably mounted in said magazine; a film delivery reel and a film receiving reel releasably fixed on said shaft; a flat elongated flexible member interconnecting said magazine with said camera; a plurality of tubular members fixedly mounted in spaced apart relation on said elongated member; a plurality of rollers mounted in each of said tubular members; a light-tight covering detachably mounted between said camera and magazine and to enclose said elongated member and tubular members; and, a power means connected to said film driving mechanism in said camera and to said shaft for actuation thereof, for moving film from said delivery reel over said rollers to said camera for exposure and thence back to said receiving reel.

3. The invention as set forth in claim 2, wherein: said tubular members are located on the same side of the flat elongated member.

4. The invention as set forth in claim 2, wherein: some of said tubular members are located on one side of said flat elongated member and the others of said tubular members are located on the other side of said flat elongated member.

References Cited in the file of this patent

UNITED STATES PATENTS

| 1,399,208 | Grabhorn | Dec. 6, 1921 |
| 1,657,795 | Guerin | Jan. 31, 1928 |
| 1,966,092 | Fried | July 10, 1934 |

FOREIGN PATENTS

| 271,565 | Italy | Feb. 12, 1930 |
| 526,644 | Germany | June 8, 1931 |
| 605,890 | Great Britain | Aug. 3, 1948 |